United States Patent [19]

Heick et al.

[11] Patent Number: 5,614,244
[45] Date of Patent: Mar. 25, 1997

[54] EGG AND CHEESE FOOD AND METHOD OF MAKING SAME

[75] Inventors: Joseph T. Heick, Syracuse; Peter E. Case, Cato; Dhyaneshwar B. Chawan, Liverpool, all of N.Y.

[73] Assignee: Borden, Inc., Columbus, Ohio

[21] Appl. No.: 460,820

[22] Filed: Jun. 2, 1995

[51] Int. Cl.$^6$ .............................. A23B 5/06; A23B 19/09
[52] U.S. Cl. ........................... 426/582; 426/89; 426/519; 426/521; 426/522
[58] Field of Search ............................ 426/582, 89, 614, 426/519, 521, 522, 106

[56] References Cited

U.S. PATENT DOCUMENTS

| | | |
|---|---|---|
| 685,665 | 10/1901 | Bell .............................................. 426/582 |
| 1,163,066 | 12/1915 | Carpenter ................................... 426/582 |
| 1,721,406 | 7/1929 | Parsons ....................................... 426/582 |
| 3,911,144 | 10/1975 | Strong et al. . | 
| 4,296,134 | 10/1981 | Boldt . |
| 4,409,249 | 10/1983 | Forkner . |
| 4,425,367 | 1/1984 | Berkowitz et al. . |
| 4,678,676 | 7/1987 | Ishizuka et al. . |
| 4,853,244 | 8/1989 | Clare et al. . |
| 4,882,194 | 11/1989 | Rapp . |

OTHER PUBLICATIONS

Evaluation of Factors Involved in Antibotulinal Properties of Pasteurized Process Cheese Spreads; Journal of Food Protection, vol. 49, No. 7; pp. 526–531 (Jul. 1986).

*Primary Examiner*—Helen Pratt
*Attorney, Agent, or Firm*—Watson Cole Stevens Davis, P.L.L.C.

[57] ABSTRACT

Disclosed is an egg and cheese food comprising a continuous phase of cheese-containing material having discrete particles of cooked egg-containing material distributed therethrough. Also disclosed, is a method of making this egg and cheese food comprising cooking the egg-containing material, then adding cheese ingredients and to the cooked egg-containing material. The products of the present invention include an egg and cheese omelette spread and egg and cheese omelette slices. The products of the present invention have extremely long shelf life and, because they are already cooked, they are convenient to eat.

26 Claims, 1 Drawing Sheet

EGG AND CHEESE FOOD AND METHOD OF MAKING SAME

BACKGROUND OF THE INVENTION

I. Field of the Invention

The present invention relates to an egg and cheese food as well as a method for making the egg and cheese food. The food has a long shelf life, especially if refrigerated, and can be eaten when removed from a refrigerator without additional cooing or it can be heated to provide a hot meal.

II. Discussion of the Background

Egg and cheese omelettes whether using regular or low fat ingredients are extremely popular foods. They are rusty and a very good source of protein. Thus, when eaten in moderation they are nutritious, wholesome food. Omelettes are typically made from whole egg. Whole egg is defined as a mixture of egg whites and yolk. Cholesterol is located in the egg yolk. Thus, products which reduce the amount of egg yolk in the eggs of an omelette are very popular and make it possible to eat omelettes often while minimizing cholesterol. Also, the omelettes can be varied in numerous ways by including extra ingredients such as vegetables or sausage.

Although egg omelettes are easy to cook, many people do not eat omelettes as often as they would like because they lack the time necessary for cooking the omelette and cleaning the pans, cooing utensils or dishes used to cook or eat omelettes. Thus, there is a need for an egg omelette product which is ready to eat cold directly out of a refrigerator or, if desire, could be quickly heated, e.g., in a microwave oven or toaster oven, to provide a hot meal. If such a product were available, then preparing eggs would be as easy as making toast.

OBJECTS OF THE INVENTION

It is an object of the present invention to provide an egg and cheese food which is ready to eat without additional cooking and has a long shelf life.

It is another object of the present invention to provide a method of making an egg and cheese food which is ready to eat without additional cooking and has a long shelf life.

SUMMARY OF THE INVENTION

The present invention provides an egg and cheese food comprising discrete solid particles which comprise pasteurized egg-containing material, e.g., whole egg or egg substitute, and a continuous phase of cheese-containing material. The food contains about 20 to about 65 parts by weight of the particles of egg-containing material and about 35 to about 85 parts by weight of the cheese-containing material. About 0 to about 10 weight percent of the particles is a milk-containing material. Preferably about 0.5 to about 8 weight percent of the particles is the milk-containing material. The egg and cheese food has a pH in the range from about 4.8 to about 7. Typically, the food has a moisture level of about 40 to about 70 weight percent. The food is edible without additional cooking and stays edible for at least about 3 months when maintained at refrigerator temperature. Preferably, the egg and cheese food has a refrigerated shelf life of about 9 months. The egg and cheese food may be made into a spread or a slice form. In the spread form, the continuous phase of cheese-containing material is a plastic semi-solid material. In the slice form, the continuous phase of cheese-containing material is a solid material. Optionally, the food includes pasteurized egg yolks, salt (sodium chloride or potassium chloride), emulsifier, gum, glacial acetic acid, sorbic acid, citric acid and colorant. While not limiting the present invention, factors such as low moisture, acidic pH and high levels of phosphate contribute to a long shelf life.

Also disclosed is a method for making the above-described egg and cheese food containing a continuous, plastic semi-solid cheese-containing phase and discrete particles comprising egg-containing material. The method comprises the steps of forming about 20 to about 65 parts by weight of a first mixture of the egg-containing material, and optionally a milk-containing material. 0 to about 10 weight percent (preferably about 0.5 to about 8 weight percent) of the first mixture is the milk-containing material. Then the first mixture is cooked in a vessel at a temperature of about 130° F. to about 150° F. for a time sufficient to pasteurize and solidify the eggs and milk of the mixture. About 35 to about 85 parts by weight of the cheese-containing material are added to the first mixture to form a second mixture. Then the second mixture is cooked at a temperature of about 170° F. to about 195° F. for a time of about 1 to about 5 minutes or until cheese ingredients form a uniform slurry. The second mixture is cooled while maintaining a pH between about 5 and about 6, to form the egg and cheese food. The food may be made as a spread or cut into slices. The food is edible without further cooking and has a long shelf life, e.g., at least three months, preferably at least nine months, when refrigerated as discussed above.

The present invention has many advantages. It provides an egg and cheese food which has a long shelf life and is ready to eat when taken out of a refrigerator. Thus, a consumer does not have to cook eggs prior to eating them. The egg and cheese food of the present invention benefits people with busy schedules who do not have the time or desire to cook. Also, the egg and cheese food of the present invention provides an alternative to other ready to eat foods such as peanut butter, cream cheese, or cold cut meat. The spread form of the egg and cheese food of the present invention is useful for spreading on toast, bagels or other bread products. The slice form of the egg and cheese food is useful for making flavorful sandwiches, e.g., taken from a refrigerator to make a cold sandwich, grilled like a grilled cheese sandwich, or put onto hamburgers or bacon.

DETAILED DESCRIPTION OF THE PREFERRED EMBODIMENT

The present invention relates to an egg and cheese food which is ready to eat without additional cooking by the consumer and has a long shelf life. Typical embodiments of the present invention include an egg and cheese spread and egg and cheese slices.

Figure 1:
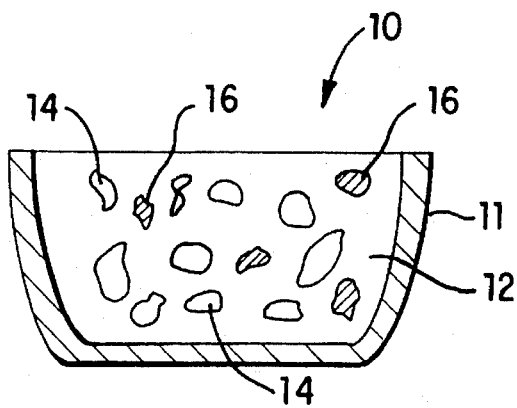
FIG. 1 shows a cross sectional view of a tub of a spread of the egg and cheese food of the present invention.

FIG. 1 shows a tub 11 containing the egg and cheese spread 10 of the present invention. The tub 11 is a conventional container such as that employed for soft margarine. The egg and cheese spread 10 has a continuous plastic semi-solid cheese phase 12 with discrete solid particles 14 comprising egg-containing material distributed therethrough. Both the cheese phase 12 and egg-containing particles 14 have been pasteurized. The spread 10 comprises about 20 to about 65 parts by weight of the particles 14 and about 35 to about 85 parts by weight of the cheese phase 12. Overall, the spread 10 contains about 40 to about 70 weight percent moisture. Optionally, pieces of meat 16, such as sausage, bacon, imitation bacon bits, ham or vegetable particles, may be distributed in the cheese phase 12 in an amount of from 0 to about 10 weight percent of the total spread 10.

Figure 2:
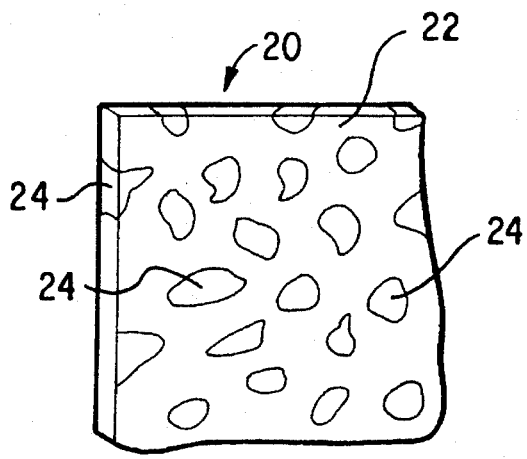
FIG. 2 shows a perspective view of a slice of the egg and cheese food of the present invention.

FIG. 2 shows another embodiment of the egg and cheese food of the present invention. In contrast to the egg and cheese spread of FIG. 1, FIG. 2 shows an egg and cheese slice 20. The slice 20 comprises a continuous solid phase of cheese-containing material 22 and discrete solid particles 24, comprising egg-containing material, distributed therethrough. The cheese-containing material 22 and egg-containing particles 24 are essentially the same as the cheese-containing material 12 and egg-containing particles 14 of FIG. 1. However, optionally, the cheese-containing material 22 of the slice 20 contains more starch and/or gum, e.g., carrageenan, than does material 12 to give material 22 a solid consistency similar to conventional pasteurized process cheese slices.

The egg and cheese foods of FIGS. 1 and 2 have substantial advantages not found in current products. The egg and cheese spread 10 of FIG. 1 has a long shelf life and is readily employable as a spread on bread products such as toast or in other ways as desired by consumers. No cooking by the consumer is necessary because the spread is pre-cooked. Thus, the spread is extremely convenient to use. The slice 20 is also convenient because it is pre-cooked and has a long shelf life. It is useful as a slice to be employed in making cold sandwiches. It is also useful when employed in hot sandwiches similar to how conventional cheese is employed in a grilled cheese sandwich or a cheeseburger. Thus, with minimal effort, one can make a hot egg and cheese sandwich meal.

The Egg-containing Particles

The particles 14, 24 of FIGS. 1 and 2, respectively, are made of an egg product comprising whole eggs or egg substitutes, such as egg whites, as known in the art. Typically, the particles 14, 24 comprise egg or egg substitute and about 0 to about 10 weight percent milk-containing material. Preferably, the particles 14, 24 are about 0.5 to about 8 weight percent milk-containing material. The milk-containing material may be whole milk, 2% fat milk, 1% fat milk, or skim milk.

The particles 14, 24 may also contain 0 to about 1.0% by weight gum or mixtures thereof such as guar, xanthan, carrageenan (a stabilizer), carboxymethyl cellulose, or the like, 0 to about 8% by weight solids such as nonfat dry milk solids, powdered egg albumin, and/or soy protein, 0 to about 15% by weight vegetable oil such as corn oil or partially hydrogenated soybean oil, 0 to about 1.0% by weight of emulsifier, and a total of 0 to about 3% by weight of colorings, vitamins, flavorings, and the like.

Egg substitutes, i.e., modified egg products, are based on egg whites and are composed of about 20 to 100% by weight egg whites, plus texturizers and/or other additives as disclosed in U.S. Pat. No. 4,882,194. Typical modified egg products that can be cooked according to the process of the present invention comprise about 20 to 99.5% by weight liquid egg white, preferably, about 70 to 99.5% liquid egg white, 0 to about 1.0% by weight, preferably about 0.1 to about 0.05% by weight, gum or mixtures thereof such as guar, xanthan, carrageenan, carboxymethyl cellulose, or the like, 0 to about 8% by weight nonfat dry milk solids, 0 to about 15% by weight vegetable oil such as corn oil or partially hydrogenated soybean oil, 0 to about 1.0% by weight of emulsifier, and a total of 0 to about 3% by weight colorings, vitamins, flavorings, and the like. Such products are commercially available, e.g., EGG BEATERS by Nabisco Brands, Inc.

An example of an egg substitute, i.e., modified egg product, is disclosed in U.S. Pat. No. 3,911,144 which discloses a substantially cholesterol free composition. The composition comprises from about 24 to 99.5% by weight of egg whites, and typically, from about 0.005 to about 0.3% by weight xanthan gum. Another example of a low cholesterol/reduced calorie modified egg product that simulates whole eggs in cooked dishes is disclosed in U.S. Pat. No. 4,296,134. The '134 patent discloses a product comprising about 60 to 96 parts by weight liquid egg whites, 0 to 18 parts water, 2 to 15 parts protein replacements such as non-fat dried milk solids, powdered egg albumin and/or soy protein, and small quantities of stabilizer, flavoring and coloring.

The above-mentioned modified egg products are liquid and may be refrigerated or frozen for storage prior to use in making the product of the present invention.

The above mentioned gums, particularly guar, xanthan, carrageenan and carboxy methyl cellulose, advantageously modify the viscosity and freeze/thaw stability of the modified egg products. These gums are available from various commercial suppliers such as Hercules Inc., Wilmington, Del., FMC Co., Philadelphia, Pa., Kelco Co., San Diego, Calif. The nonfat dry milk solids are desirable as an additional source of protein and may improve the texture of cooked egg products and reduce the separation of water therefrom.

Typically, about 0 to about 5% of nonfat dry milk solids are employed in the embodiments of the present invention, especially those which employ egg substitutes.

Moreover, embodiments which employ egg substitutes typically employ the above mentioned vegetable oil to replace the oils naturally present in egg yolk. Vegetable oils such as corn, cottonseed, soybean, sunflower, peanut, rape seed, olive and sesame oils and mixtures thereof are preferred because they contain less saturated fat than other usable oils. Preferably, egg substitutes comprise about 7.5 to about 12 weight percent vegetable oil. The oil may also be useful for disbursing oil soluble colorings in the egg substitute when there is no yolk.

The emulsifier, optionally employed in the particles 14, 24, includes lecithin or another food-compatible synthetic or natural emulsifier. The emulsifier is principally useful for preventing the egg-containing material from sticking to the vessel in which it is cooked. Of the synthetic emulsifiers, polyoxy (lower) alkylene mono-and di-glycerides are preferred. The total emulsifier will preferably comprises about 0.25 to about 0.75 weight percent of the particles 14, 24. Emulsifiers may also influence the texture and homogeneity of the egg-containing material both before and after cooking.

The Cheese Phase

The continuous phase 12, 22 of cheese-containing material of FIGS. 1 and 2, respectively, is typically a process cheese, i.e., pasteurized process cheese, pasteurized process cheese food, or pasteurized process cheese spread, as these terms are known in the art (See Title 21 of the United States Code of Federal Regulations, Section 133). The cheese-containing material of the continuous phase 12, 22 may also be non-standardized pasteurized process cheese products which are low fat or fat free yet contain some cheese and/or skim cheese.

For example, pasteurized process cheese is defined by Title 21 of the United States Code of Federal Regulations Section 133.169 (1989). Pasteurized process cheese has a moisture level of ≦43.0%, a fat level of ≧47.0% (based on cheese solids) and may also have melting salts, preservatives and butterfat. In particular, pasteurized process cheese is the food prepared by comminuting and mixing, with the aid of heat, one or more cheeses of the same or two or more varieties, except cream cheese, neufchatel cheese, cottage cheese, low fat cottage cheese, cottage cheese, dry curd, cook cheese, hard grating cheese, semisoft part-skim cheese, part-skim spiced cheese and skim milk cheese for manufacturing with an emulsifying agent into a homogeneous plastic mass.

The emulsifying agent, i.e., melting salt, is one or any mixture of two or more of the following: monosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate and sodium potassium tartrate, in such quantity that the weight of the solids of such emulsifying agent is not more than 3 percent of the weight of the pasteurized process cheese. Melting salts fall within the general class of mineral emulsifiers. The melting salts help the protein in the cheese bind to the fat during cooking.

One or more of the following optional ingredients may also be included in pasteurized process cheese:

(1) An acidifying agent consisting of one or any mixture of two or more of the following: a vinegar, lactic acid, citric acid, acetic acid and phosphoric acid, in such quantity that the pH of the pasteurized process cheese is not below 5.3.

(2) Cream, anhydrous milk fat, dehydrated cream, or any combination of two or more of these, in such quantity that the weight of the fat derived therefrom is less than 5 percent of the weight of the pasteurized process cheese.

(3) Water.

(4) Salt.

(5) Harmless artificial coloring.

(6) Spices or flavorings, other than any which singly or in combination with other ingredients simulate the flavor of a cheese of any age or variety.

(7) Pasteurized process cheese in the form of slices or cuts in consumer-sized packages may contain an optional mold-inhibiting ingredient of not more than 0.2 percent by weight of sorbic acid, potassium sorbate, sodium sorbate, or any combination of two or more of these, or not more than 0.3 percent by weight of sodium propionate, calcium propionate, or a combination of sodium propionate and calcium propionate.

(8) Pasteurized process cheese in the form of slices or cuts in consumer-sized packages may contain lecithin as an optional anti-sticking agent in an amount not to exceed 0.03 percent by weight of the finished product.

(9) Safe and suitable enzyme modified cheese.

During its preparation, pasteurized process cheese is heated for not less than 30 seconds at a temperature of not less than 150° F. When tested for phosphatase, the phenol equivalent of 0.25 gram of pasteurized process cheese is not more than 3 micrograms.

Pasteurized process cheese food contains ≦44 weight percent moisture, ≧23 weight percent fat, and ≧51 weight percent natural cheese, as well as other ingredients, e.g., melting salts, milk, whey, acidifying agent, water, salt or coloring. Pasteurized process cheese spread contains from about 44 to about 60 weight percent moisture and ≧20 weight percent fat as well as other ingredients, e.g., emulsifiers, known in the art.

The cheese from which the process cheese is made includes natural cheeses of any variety such as American, i.e., cheddar, swiss, mozzarella, colby, provolone or the like. An example of a natural commercial cheese is low moisture part skim mozzarella from Sorrento Cheese Co., Buffalo, N.Y. The natural cheeses typically have a pH of about 5 to about 7 and contain from about 30 to about 60% by weight water, about 15 to about 30% by weight fat, about 20 to about 36% by weight protein, 0 to about 5.5% by weight salt (sodium chloride), about 1 to about 6% by weight ash (after pyrolysis) and minor amounts of colors, flavoring, vitamins and/or other cheese compatible ingredients.

Preferably, continuous phase 12, 22 (except for low fat or fat free synthetic varieties described below) includes about 51 to about 95 weight percent natural cheese, 0 to about 5 weight percent additional salt, 0 to about 1 weight percent of an anti-microbial agent, e.g. sorbic acid, 0 to about 3 weight percent citric acid, 0 to about 3 weight percent glacial acetic acid, 0 to about 7 weight percent added water for an overall moisture level of about 40 to about 70 weight percent, 0 to about 5 weight percent food coloring, 0 to about 2 weight percent gum stabilizer, and 0 to about 5 weight percent vegetable oil, about 0 to about 5 weight percent melting salts (i.e., mineral emulsifiers) and about 0 to about 10 weight percent added butterfat, and other conventional process cheese ingredients. Typical gum stabilizers for process cheese include guar gum, xanthan gum and/or locust bean gum. A typical mixture of these gum stabilizers is known as GFS gum.

The continuous phase 12, 22 may comprise synthetic cheese. Synthetic cheese includes pasteurized process cheese substitute and pasteurized process imitation cheese products, as these terms are known in the art. Typical synthetic cheese is prepared with about 30 to about 55 weight percent water, about 15 to about 20 weight percent casein, about 15 to about 20 weight percent oil, as described above, preferably partially hydrogenated soybean oil, about 0 to 15 weight percent of natural cheese, about 0 to 10 weight percent whey, about 1 to about 5 weight percent skim milk, about 0 to about 5 weight percent salt, about 0 to about 5 weight percent enzyme modified cheese, about 0 to about 0.3 weight percent anti-microbial agent such as sorbic acid or its calcium, sodium, and/or potassium salts, about 0 to about 1 weight percent sodium citrate and/or one or more other melting salts (mineral emulsifiers), a sufficient quantity of acid such as lactic acid to adjust the pH of the mixture to about 4 to about 6, and about 0 to about 3 weight percent modified food starch. Also, about 0 to about 10 weight percent vitamins additional flavoring and coloring may be present. An example of a commercial synthetic cheese employable in the present invention is AMERICAN SANDWICH-MATE available from Borden, Inc., Columbus, Ohio.

Method for Making the Egg and Cheese Food of the Present Invention

Figure 3:
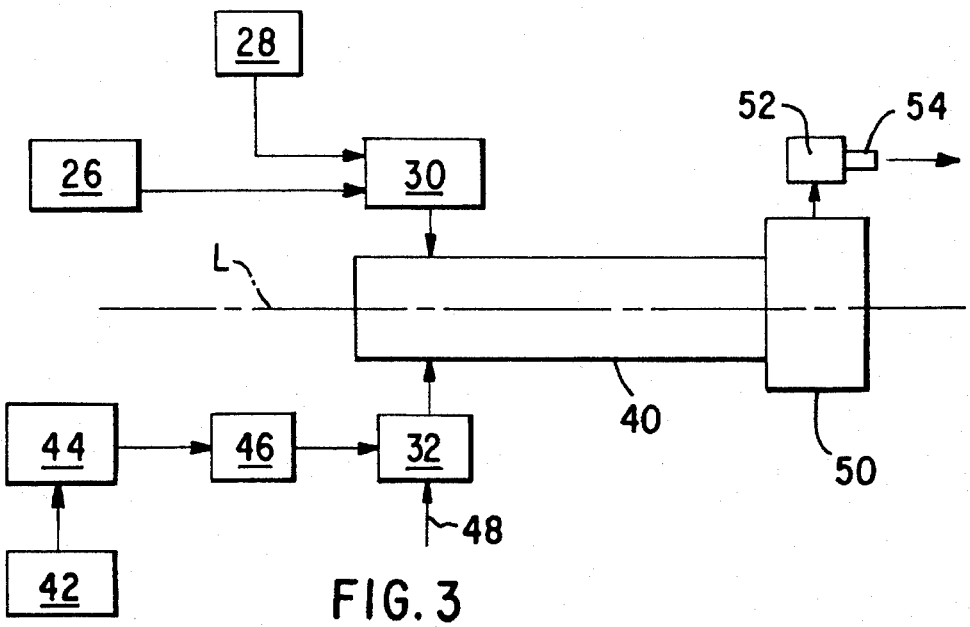
FIG. 3 shows a schematic block flow diagram of a method for making the egg and cheese food of the present invention.

FIG. 3 shows a schematic of a process flow diagram describing a method of the present invention. Typically, milk, eggs and cheese employed as starting ingredients for the process of FIG. 3 are initially employed at any temperature in the range from a refrigerator temperature (typically about 36° to 42° F.) to room temperature (typically about 68° to about 72° F.). As shown by FIG. 3, milk-containing material (as defined above) from a milk holding tank 26 and egg-containing material (as defined above) from an egg holding tank 28 are fed to a first blender 30 where the milk and egg are mixed together thoroughly. These ingredients are fed to the blender 30 to make about 20 to about 65 parts by weight of the mixture, wherein the mixture is 0 to about 10 weight percent milk-containing material. The combined milk and egg mixture is fed from the blender 30 to a cooker 40. The cooker 40 cooks the egg and milk mixture at 130° to 150° F. for a time sufficient to solidify and pasteurize the mixture. The temperature for cooking may be maintained by steam injection or other method as known in the art. In the embodiment of cooker 40, the cooked egg and milk mixture is moved along a direction parallel to a longitudinal axis L of the cooker 40 by a pair of rotating augers (not shown) contained within the cooker 40.

Cheese-containing material (as defined above) is provided to the cooker 40 as follows. Natural cheese from a debarreling/demolding station 42 is transferred to a cheese weighing and loading station 44 and then proceeds to a grinder extruder 46. The grinder extruder 46 grinds the cheese through a plate having ¼ to 1 inch holes to form particles. The cheese particles are then air conveyed to a second blender 32 where they are combined with additional ingredients provided by a feed stream 48. The additional ingredients include melting salts, preservatives, food coloring and the like.

The additional ingredients and cheese particles are blended thoroughly in the second blender 32 to form cheese-containing material. Then about 35 to about 85 parts by weight of the cheese-containing material are transferred to the cooker 40 after the egg and milk mixture is already pasteurized and solidified. Typically, the particles of cheese-containing material are transferred from the second blender 32 to the cooker 40 by an auger (not shown). In the cooker 40, the particles of cheese-containing material from the second blender 32 melt and mix with the pasteurized and solidified egg and milk mixture due to the rotating action of the pair of augers (not shown) in the cooker 40. The temperature is then increased in the cooker 40 to a target temperature in the range from about 170° to about 195° F. When the target temperature is reached, the steam (or other means for adding heat to the cooker 40) is stopped and a pH of the cooked mixture is measured. Desirably, the pH is in the range from about 4.8 to about 7, preferably in the range from about 5 to about 6, most preferably in the range from about 5.4 to about 5.6. If a desired pH is not measured, then acid, such as lactic acid or glacial acetic acid (typically 50% strength) is added to the cooked mixture in the cooker 40 and mixed with the cooked mixture. (The acid may be added prior to or during cooking to ensure the product will have the desired pH, and avoid adding acid after cooking.) Then the cooked mixture is discharged from the cooker 40 into a holding tank 50. From the holding tank 50, the mixture is conveyed to a pump 52 which discharges the cooked mixture as the egg and cheese food through a discharge port 54 which leads to downstream processing such as packaging or slicing.

It is important that the egg and milk mixture is cooked to be solidified and pasteurized prior to addition of the cheese to the cooker 40. This results in better cheese/egg particle identity. In contrast, adding the egg, milk and cheese simultaneously to the cooker 40 and cooking them together does not result in such particle identity. Particle identity is important to provide a food product where the consumer can see both the egg and the cheese.

The egg and cheese food produced by the method of FIG. 3 may be packaged as a spread in tubs, molds, individual servings with crackers, whipped (aerated) or as slices. Optionally, sausage, bacon, bacon bits, ham or vegetable particles may be added to the cheese in the second blender 32 and then subsequently processed in the cooker 40.

Rather than employing the above method, the egg-containing material and cheese-containing material may be cooked separately and then, while both ingredients are hot, blended at a temperature from about 160° F. to about 195° F.

The present invention has the substantial advantages of providing a quick, ready to eat egg and cheese food for the consumer that does not have time or desire to cook an omelette. The egg and cheese food has an extremely long shelf life of up to about 9 months when refrigerated. This makes it an extremely convenient food for consumers. Moreover, by substituting low fat and low cholesterol materials for the whole eggs and whole milk, low fat, low cholesterol versions of the egg and cheese foods can be produced.

The present invention is further illustrated by the following non-limiting examples.

EXAMPLE 1

To make an egg/cheese omelette spread, scrambled eggs, 2% fat milk, American (cheddar) cheese and other ingredients listed in TABLE I below were combined as follows. 35.00 pounds of scrambled whole eggs and 2.78 pounds of 2% fat milk were mixed and then cooked in a cooker, such as cooker 40 of FIG. 3. The cooker employed for this example is known in the art as a "cheese cooker". The cooker has two blenders capable of feeding a cylindrical cooking chamber. The cooking chamber contains two rotating augers for mixing food ingredients in the chamber. Heat was provided to the cooker by injecting 2.24 pounds of steam at a rate of about 0.38 pounds/min. into the cheese cooker as the eggs and milk are cooked as well as subsequently when cheese is being cooked. The egg and milk mixture is cooked, to a temperature of about 150° F. for a time about 1 to about 2 minutes, sufficiently for pasteurizing and solidifying the egg and milk. Then American cheese, DSP-DUO, TSP-DD, salt, sorbic acid, GFS gum and C73 coloring in the amounts listed in TABLE 1 below were blended in one of the above-mentioned blenders, then added to the cooker and then mixed with the solidified egg and milk mixture.

TABLE 1

| INGREDIENTS | % | POUNDS | GRAMS |
|---|---|---|---|
| American Cheese | 85.28 | 29.85 | 13538.75 |
| DSP-DUO[1] | 2.000 | 0.70 | 317.51 |
| TSP-DD[2] | 1.000 | 0.35 | 158.85 |
| Salt | 3.180 | 1.11 | 504.85 |
| Sorbic Acid | 0.600 | 0.21 | 95.25 |
| GFS Gum[3] | 0.200 | 0.07 | 31.75 |
| C7[4] | 0.025 | 0.01 | 3.97 |
| Acetic Acid-Glacial (50% Strength) | 1.2 | 0.42 | 190.51 |
| Steam | 6.5100 | 2.28 | 1033.50 |
| TOTALS | 100.0 | 35 | 15874.85 |

[1]Disodium Phosphate - duo hydrate
[2]Trisodium Phosphate - dodecahydrate
[3]Guar gum, xanthan gum, locust bean gum mixture by Kelco Co., San Diego, California
[4]Coloring known as apo-carotenal, manufactured by Hoffmann-La Roche, Nutley, New Jersey The combined ingredients are cooked to 190° F. Then the heating was stopped and the mixture was allowed to cool in the cooker. During cooling, the pH of the cooked ingredients was measured and adjusted to 5.4 by addition and mixing of 190.51 grams of 50% strength glacial acetic acid listed in TABLE 1 above. The resulting egg and cheese spread passed from the cooker to a holding tank and was then packed in tubs. Then the spread was inverted for 1 hour in the tubs and refrigerated.

EXAMPLE 2

3400 grams of scrambled whole eggs and 272 grams of 2% fat milk are mixed and then cooked in a cooker such as cooker 40 of FIG. 3 at a temperature of about 160° to 170° F. for a time sufficient to pasteurize and solidify the egg and milk. The egg and milk mixture is cooked by injecting steam at a rate of about 35.2 grams/min. into the cooker. After cooking, American cheese and the other ingredients in the amounts listed in TABLE 2 below and 300 grams of bacon bits were blended in one of the above-mentioned blenders. Then these ingredients were mixed with the solidified and pasteurized egg and milk mixture in the cooker.

TABLE 2

| INGREDIENTS | % | POUNDS | GRAMS |
| --- | --- | --- | --- |
| American Cheese | 86.68 | 6.5 | 2948.79 |
| DSP-DUO[1] | 2.000 | 0.15 | 68.04 |
| TSP-DD[2] | 1.000 | 0.08 | 34.02 |
| Salt | 3.180 | 0.24 | 108.18 |
| Sorbic Acid | 0.600 | 0.05 | 20.41 |
| GFS Gum[3] | 0.300 | 0.02 | 10.21 |
| G73[4] | 0.025 | 0.002 | 0.85 |
| Steam | 6.210 | 0.47 | 211.26 |
| TOTALS: | 100.0 | 7.5 | 3401.76 |

[1]Disodium Phosphate - duo hydrate
[2]Trisodium Phosphate - dodecahydrate
[3]Guar gum, xanthan gum, locust bean gum mixture
[4]Coloring known as apo-carotenal The mixture was then heated to about 190° F. and allowed to cool in the cooker. During cooling, when the mixture was at a temperature of about 170° F., 50 milliliters of 50% glacial acetic acid were added to mix with the cooked ingredients in the cooker to adjust the pH to about 5.5. The mixture then passed to a holding tank and was then packed into tubs. This resulting mixture was a cheese and egg omelette spread with bacon bits.

EXAMPLE 3

5000 grams of scrambled whole eggs and 400 grams of 2% fat milk were taken from a refrigerator at about 38° F. and placed into a Hobart mixer (a steam jacketed kettle). The egg and milk mixture was heated in the Hobart mixer to a temperature of about 150° to about 160° F. for a time sufficient to pasteurize and solidify the egg and milk. American cheese and other ingredients were cooked in a cooker, such as that of FIG. 3, in the amounts listed in TABLE 3 below by steam at a rate of about 54.1 grams per minute.

TABLE 3

| INGREDIENTS | % | POUNDS | GRAMS |
| --- | --- | --- | --- |
| American Cheese | 86.0 | 9.46 | 4290.96 |
| TSP-DD[1] | 1.820 | 0.20 | 90.81 |
| SHMP[2] | 0.910 | 0.10 | 45.40 |
| Sweet whey | 3.180 | 0.35 | 158.67 |
| 250X Gelatin[3] | 0.635 | 0.07 | 31.68 |
| Salt | 0.673 | 0.07 | 33.58 |

TABLE 3-continued

| INGREDIENTS | % | POUNDS | GRAMS |
| --- | --- | --- | --- |
| Sorbic Acid | 0.182 | 0.02 | 9.08 |
| GFS Gum[4] | 0.091 | 0.01 | 4.54 |
| Steam | 6.510 | 0.72 | 324.82 |
| TOTALS: | 100.0 | 11.00 | 4989.54 |

[1]Trisodium Phosphate - dodecahydrate
[2]Sodium hexametaphosphate
[3]250 Bloom gelatin
[4]Guar gum, xanthan gum, locust bean gum mixture An 1800 gram portion of the cooked egg and milk mixture was blended with a 1800 gram portion of the cooked cheese (while both portions were still hot) and allowed to cool. This resulted in a cheese spread having a pH of about 6.6.

Also, a 2340 gram portion of the cooked egg and milk mixture was blended with a 1260 gram portion of the cooked cheese (while both portions were still hot) and allowed to cool. This resulted in a cheese spread having a pH of about 6.6.

EXAMPLE 4

The procedure of Example 3 was repeated in the Hobart mixer of Example 3 with a mixture of about 3400 grams of scrambled whole eggs and about 272 grams of 2% fat milk. The mixture was cooked to a temperature of about 150° F. sufficient to pasteurize and solidify the egg and milk. Then, American cheese and other ingredients in the amounts listed in TABLE 4 were cooked in a cheese cooker, such as that of FIG. 3, to a temperature of about 185° F. by direct steam injection at a rate of about 46.3 grams/minute. Then the cooked egg and milk mixture was transferred from the Hobart mixer to the cheese cooker and blended with the cheese to form a uniform dispersion. The mixture was then allowed to cool. During cooling, the pH of the cooked mixture was tested and found to be above about 6. Thus, 57 milliliters of 50% glacial acetic acid were added to the cooked mixture to decrease the pH of the mixture to about 5.5. After this pH adjustment, the mixture was reheated to 170° F. and then allowed to cool. This resulted in an egg and cheese spread.

TABLE 4

| INGREDIENTS | % | POUNDS | GRAMS |
| --- | --- | --- | --- |
| American Cheese | 86.0 | 6.45 | 2925.66 |
| DSP-DUO[1] | 2.000 | 0.15 | 68.04 |
| TSP-DD[2] | 1.000 | 0.075 | 34.02 |
| Salt | 2.000 | 0.15 | 68.04 |
| Sorbic Acid | 0.600 | 0.045 | 20.41 |
| GFS Gum[3] | 0.200 | 0.015 | 6.80 |
| C73[4] | 0.025 | 0.002 | 0.85 |
| Steam | 8.170 | 0.613 | 277.94 |
| TOTALS: | 100.0 | 7.50 | 3401.75 |

[1]Disodium Phosphate - duo hydrate
[2]Trisodium Phosphate - dodecahydrate
[3]Guar gum, xanthan gum, locust bean gum mixture
[4]Coloring known as apo-carotenal

EXAMPLE 5

The procedure of Example 6 was repeated with 3400 grams of scrambled whole eggs and 272 of grams of 2% fat milk. The scrambled eggs and milk were added to the Hobart mixer of Example 6 and cooked to be solidified and pasteurized. At a temperature of about 140° F., the eggs began coagulating. At a temperature of about 160° F., the coagulation was essentially complete. Then, American cheese and other ingredients listed in TABLE 4 above were cooked in a cheese cooker such as that of FIG. 3 to a temperature of about 190° F. by direct injection of steam at a rate of about 46.3 grams per minute. About 57 milliliters of 50% glacial acetic acid was added to the cheese during cooking. The cooked egg and milk mixture was added to the cooked cheese in the cheese cooker and mixed to form a uniform dispersion. Then the pH of this mixture was measured and found to be about 6. It was then adjusted by addition of 13 milliliters of 50% concentration glacial acetic acid to achieve a pH of about 5.8. After further mixing, the mixture was allowed to cool to result in an egg and cheese spread.

EXAMPLE 6

To make a fat free spread, a mixture of an egg substitute comprising 1500 grams of egg whites were added to the cooker of Example 2 and heated by direct steam injection at a rate of about 97.3 grams per minute, to a temperature of about 150° F. for a time sufficient to solidify and pasteurize the mixture. Then Danish skim cheese and other ingredients as listed in TABLE 5 below were added to the solidified and pasteurized mixture. This mixture was then heated to a temperature of about 180° F. for a time of about 1 minute. During cooking about 60 milliliters of 50% strength glacial acetic acid was added. After further mixing, the mixture was allowed to cool to result in a fat free egg and cheese spread having a moisture level of about 60.3% and a pH of about 5.73.

TABLE 5

| INGREDIENTS | WEIGHT (GRAMS) |
| --- | --- |
| Skim Cheese - Danish | 1850.00 |
| CSS 24DE[1] | 418.70 |
| NFDM[2] | 144.25 |
| National Ultra Tex 2[3] | 225.00 |
| National N Lite D[3] | 75.00 |
| Salt | 75.00 |
| Sorbic Acid | 15.00 |
| DSP - DUO[4] | 100.00 |
| TSP - DD[5] | 25.00 |
| Steam | 583.55 |
| Hansen A - 6HH[6] | 3.00 |
| GFS[7] | 5.00 |
| Egg whites[8] | 1500.00 |

[1]Corn syrup solids 24 - Dextrose Equivalent
[2]Non - fat dry milk
[3]Starch manufactured by National Starch, Bridgewater, New Jersey
[4]Disodium Phosphate - duo hydrate
[5]Trisodium Phosphate - dodecahydrate
[6]Annatto Color manufactured by Chris Hansen's Laboratory, Inc., Milwaukee, Wisconsin., U.S.A., 1.5 grams was added to the egg substitute and 1.5 grams was added to the fat free cheese.
[7]Guar gum, xanthan gum, locust bean gum mixture manufactured by Kelco Co., San Diego, California
[8]Manufactured by Papetti Hygrade Products, Inc., Elizabeth, New Jersey The egg and cheese food of the present invention provides a tasty combination of cheese and fully cooked eggs that is ready to eat. For example, the egg and cheese food can be spread, or placed as a slice, on bread or an English muffin and eaten as is. Also, it may be eaten after heating in a microwave, for as little as 20 seconds, as a delicious, healthy hot meal. The egg and cheese spread or slices may be provided in various varieties including egg and cheese, egg and cheese with bacon, egg and cheese with sausage, egg and cheese—western style (with peppers and onions) as well as fat free variations of these products.

While specific embodiments of the present invention have been above described, it is understood that other embodiments within the spirit an scope of the present invention are also included. Thus, the present invention is not limited by the aforementioned description, but is defined by the claims appended hereto.

What is claimed is:

1. An egg and cheese food comprising a continuous first phase comprising a cooked cheese-containing material comprising at least one member of the group consisting of process cheese and synthetic cheese, and a second phase of cooked discrete solid particles distributed throughout the first phase, the discrete solid particles comprising pre-cooked pasteurized egg whites and, optionally, milk-containing material and, optionally, pre-cooked pasteurized egg yolks, wherein about 20 to about 65 parts by weight of the food is the discrete solid particles and about 35 to about 85 parts by weight of the food is the continuous first phase, the food has a pH in the range from about 4.8 to about 7, and the food is edible without additional cooking, said egg and cheese food being storable at refrigerator temperature for at least about 3 months.

2. The egg and cheese food of claim 1, wherein the discrete solid particles comprise about 0 to about 10 weight percent milk-containing material, 0 to about 1 weight percent gum, 0 to about 8 weight percent of solids selected from the group consisting of nonfat dry milk solids, powdered egg albumin, soy protein and mixtures thereof, 0 to about 15 weight percent vegetable oil, 0 to about 1 weight percent emulsifier and 0 to about 3 weight percent total of a member of the group consisting of colorings, vitamins, flavorings and mixtures thereof.

3. The egg and cheese food of claim 2, wherein the cheese-containing material comprises the synthetic cheese and the synthetic cheese comprises at least one melting salt.

4. The egg and cheese food of claim 1, wherein the continuous first phase comprises about 0 to about 5 weight percent melting salt, 0 to 5 weight percent sodium chloride, 0 to about 1 weight percent sorbic acid, 0 to about 3 weight percent citric acid, 0 to 3 weight percent glacial acetic acid, 0 to about 7 weight percent water, 0 to about 5 weight percent food coloring, 0 to about 2 weight percent gum, and 0 to about 5 weight percent vegetable oil.

5. The egg and cheese food of claim 4, wherein the melting salt is selected from the group consisting of disodium phosphate, trisodium phosphate and mixtures thereof.

6. The egg and cheese food of claim 1, wherein the egg and cheese food contains about 40 to about 70 weight percent moisture.

7. The egg and cheese food of claim 1, wherein the cheese-containing material has a moisture level of about 40 to about 70 weight percent.

8. The egg and cheese food of claim 1, wherein the cheese-containing material comprises the process cheese and the process cheese comprises at least one melting salt and the pH of the food is about 5 to about 6.

9. The egg and cheese food of claim 1, further comprising particles of sausage, bacon, imitation bacon bits, or vegetable distributed throughout the continuous first phase.

10. The egg and cheese food of claim 1, wherein the continuous first phase is a plastic semi-solid material and the food is a spread.

11. The egg and cheese food of claim 1, wherein the continuous first phase is a solid material and the food is in slice form.

12. A method for making an egg and cheese food containing a continuous cheese-containing phase and discrete particles of egg-containing material comprising the steps of:

forming a first mixture of about 20 to about 65 parts by weight of egg-containing material the egg-containing material comprising egg whites, and, optionally, egg yolks and, optionally, milk-containing material;

cooking the first mixture at a temperature of about 130° F. to about 150° F. for a time sufficient to pasteurize and solidify the mixture;

cooking about 35 to about 85 parts by weight of a cheese-containing material comprising at least one member of the group consisting of process cheese and synthetic cheese, at a temperature of about 170° F. to about 195° F.;

after the cooking of the first mixture, combining the cheese-containing material and the solidified and pasteurized first mixture to form a second mixture;

providing the second mixture with a temperature in the range of about 160° F. to about 195° F.; and cooling the second mixture, while obtaining a pH between about 4.8 and about 7, to form the egg and cheese food, the food being edible without further cooking.

13. The method of claim 12, wherein the cheese-containing material is cooked and then added to the solidified and pasteurized first mixture to form the second mixture.

14. The method of claim 12, wherein the cheese-containing material is added as discrete pieces to the solidified and pasteurized first mixture to form the second mixture, and the second mixture is cooked at a temperature of about 170° F. to about 195° F.

15. The method of claim 14, wherein the first and second mixtures are heated by steam injection.

16. The method of claim 12, further comprising including in the egg-containing material about 0 to about 10 weight percent of the milk-containing material, 0 to about 1 weight percent gum, 0 to about 8 weight percent of solids selected from the group consisting of nonfat dry milk solids, powdered egg albumin, soy protein and mixtures thereof, 0 to about 15 weight percent vegetable oil, 0 to about 1 weight percent emulsifier and 0 to about 3 weight percent total of a member of the group of colorings, vitamins, flavorings and mixture thereof.

17. The method of claim 12, further comprising adding to the cheese-containing material 0 to about 5 weight percent melting salt, 0 to about 5 weight percent sodium chloride, 0 to about 1 weight percent sorbic acid, 0 to about 3 weight percent citric acid, 0 to about 3 weight percent glacial acetic acid, 0 to about 7 weight percent water, 0 to 5 weight percent food coloring, 0 to about 2 weight percent gum, and 0 to about 5 weight percent vegetable oil.

18. The method of claim 17, wherein the melting salt is selected from the group consisting of disodium phosphate, trisodium phosphate and mixtures thereof.

19. The method of claim 12, wherein citric acid or glacial acetic acid is added to the second mixture while it is cooling to obtain a pH of about 5 to about 6.

20. The method of claim 12, wherein the egg-containing material and milk-containing material each have a temperature of from about 34° F. to about room temperature when they are initially employed to form the first mixture.

21. The method of claim 12, wherein the cheese-containing material has a moisture level of about 40 to about 70 weight percent.

22. The method of claim 12, wherein the cheese is process cheese, the process cheese comprises at least one melting salt, and the pH is maintained at a level of about 5 to about 6.

23. The method of claim 12, further comprising adding particles of sausage, bacon, artificial bacon bits, or vegetable to the first mixture, second mixture or both the first mixture and second mixture.

24. The method of claim 12, further comprising slicing the food.

25. The method of claim 12, further comprising packaging the food as a spread.

26. An egg and cheese food made by the method of claim 12.

* * * * *